(12) United States Patent
Hirano

(10) Patent No.: US 8,329,290 B2
(45) Date of Patent: Dec. 11, 2012

(54) SILICONE RESIN COMPOSITION

(75) Inventor: Keisuke Hirano, Ibaraki (JP)

(73) Assignee: Nitto Denko Corporation, Ibaraki-shi (JP)

( * ) Notice: Subject to any disclaimer, the term of this patent is extended or adjusted under 35 U.S.C. 154(b) by 331 days.

(21) Appl. No.: 12/639,452

(22) Filed: Dec. 16, 2009

(65) Prior Publication Data

US 2010/0155871 A1 Jun. 24, 2010

(30) Foreign Application Priority Data

Dec. 22, 2008 (JP) ................................ 2008-325923
Dec. 22, 2008 (JP) ................................ 2008-325924
Dec. 22, 2008 (JP) ................................ 2008-325925

(51) Int. Cl.
*B32B 5/16* (2006.01)

(52) U.S. Cl. ........ 428/323; 428/328; 428/402; 428/403; 428/404; 428/405; 428/406; 428/407; 428/446

(58) Field of Classification Search ................. 428/323, 428/402–407, 328, 446
See application file for complete search history.

(56) References Cited

U.S. PATENT DOCUMENTS

| | | | | |
|---|---|---|---|---|
| 7,868,117 B2 * | 1/2011 | Isogai et al. | ..................... | 528/26 |
| 2002/0091221 A1 * | 7/2002 | Leempoel et al. | ................. | 528/12 |
| 2008/0103241 A1 | 5/2008 | Isogai et al. | | |
| 2009/0163654 A1 * | 6/2009 | Hirano | ......................... | 524/783 |
| 2010/0089451 A1 | 4/2010 | Harimoto et al. | | |

FOREIGN PATENT DOCUMENTS

| | | |
|---|---|---|
| CN | 1354202 A | 6/2002 |
| CN | 1532938 A | 9/2004 |
| EP | 1 209 201 A1 | 5/2002 |
| EP | 1209201 A1 * | 5/2002 |
| EP | 2 075 277 A2 | 7/2009 |
| GB | 1041081 * | 9/1966 |
| JP | 9-208438 | 8/1997 |
| JP | 2000-63119 | 2/2000 |
| JP | 2005-76003 | 3/2005 |
| JP | 2006-83033 | 3/2006 |
| JP | 2006-131547 | 5/2006 |
| JP | 2007-119617 | 5/2007 |
| JP | 2008-115207 | 5/2008 |
| JP | 2008-120848 | 5/2008 |
| JP | 2008-189765 | 8/2008 |
| JP | 2010-7057 | 1/2010 |

OTHER PUBLICATIONS

Office Action issued Apr. 27, 2011, in Japan Patent Application No. 2008-325924.
Office Action issued Apr. 27, 2011, in Japan Patent Application No. 2008-325925.
Office Action issued Jun. 30, 2011, in Japan Patent Application No. 2008-325923.

* cited by examiner

*Primary Examiner* — Leszek Kiliman
(74) *Attorney, Agent, or Firm* — Oblon, Spivak, McClelland, Maier & Neustadt, L.L.P.

(57) ABSTRACT

A silicone resin composition containing (i) a silicone resin and (ii) fine metal oxide particles without having a reactive functional group or with a protected reactive functional group on the surface thereof (fine metal oxide particles B), wherein the silicone resin is obtained by carrying out a polymerization reaction between a silicone derivative having an alkoxysilyl group at an end of a molecule and a molecular weight of from 200 to 3000, and fine metal oxide particles having a reactive functional group on the surface thereof (fine metal oxide particles A), and wherein the fine metal oxide particles B are dispersed in the silicone resin (Embodiment 1); a silicone resin.

22 Claims, No Drawings

SILICONE RESIN COMPOSITION

BACKGROUND OF THE INVENTION

1. Field of the Invention

The present invention relates to a silicone resin composition. More specifically, the present invention relates to a silicone resin composition having excellent transparency and a high refractive index, a method for producing the silicone resin composition, a sheet-like formed article made of the composition, and a photosemiconductor device encapsulated with the composition.

2. Discussion of the Related Art

Since silicone resins have excellent heat resistance and light fastness, as compared to materials made of organic polymers, there is an increasing use in the field of electronic materials that necessitate high durability. Among them, in a photosemiconductor encapsulating material having high brightness, a film for solar energy having strict operable environments and requiring durability, lens for which operable conditions are strict, or the like, silicone resins are widely used.

It is known that a disadvantage of a silicone resin is in a low refractive index. A general silicone resin has a refractive index of 1.4 or so, which is lower than a widely used material made of an organic polymer by 0.1 or so. A silicone resin having a low refractive index as mentioned above is desired to have the improvement in light-extracting efficiency, from the viewpoint of conservation of energy in, for example, a photosemiconductor encapsulating material having high brightness. Therefore, there is an urgent matter of improving a refractive index.

On the other hand, as a means of improving a refractive index of a silicon resin per se, Japanese Patent Laid-Open No. 2005-76003 reports a method of introducing a bulky aromatic substituent into a silicone resin. According to the publication, a refractive index can be increased from 1.4 to slightly over 1.5 by introducing a phenyl group having a high refractive index as a substituent for a silicon atom.

In addition, a method for adjusting a refractive index of a resin by dispersing a high-refractive index metal oxide, such as titanium oxide, zirconium oxide or barium titanate, in the resin is studied. For example, it is said that a material having an enhanced transmittance of visible light and excellent transparency can be provided by forming a metal oxide into fine particles. However, in general, it is difficult to disperse hydrophilic metal oxide particles in a hydrophobic and water-repellent silicone resin, and in particular, it is difficult to apply those particles to applications that require transparency. Even if the metal oxide particles are dispersed with a disperser or the like, although a thin film of 10 μm or so can relatively keep transparency, transparency is drastically lowered when a thickness of a film reaches that thickness or more.

In view of the above, Japanese Patent Laid-Open No. 2006-131547 discloses fine metal oxide particles dispersant formed by copolymerizing an acrylic site having affinity to titanium oxide particles with a silicone site having affinity to a silicone resin, in order to disperse the particles in the silicone resin. In addition, Japanese Patent Laid-Open No. Hei 9-208438 reports a method of dispersing titanium oxide by utilizing a silicic acid derivative which works as a dispersant.

On the other hand, in particles prepared on the basis of a sol-gel method or the like, the size of the primary particles can be generally controlled to a size of several nanometers to several dozen nanometers or so, so that there is an advantage of excellent monodisperse property. In a sol-gel method, since a reaction is usually carried out in a water-alcohol system, if the particles obtained are to be dispersed in the resin, a dispersion medium of the particles must be replaced with a solvent for dissolving the resin. However, even if the solvents are tried to be simply replaced, the affinity of the surface of the fine particles and the solvent is low, so that the particles are more likely to be aggregated in many cases. In view of the above, a method of carrying out a solvent substitution of particles prepared by a sol-gel method after treating the particles with a surface treatment agent such as a silane coupling agent is disclosed (see Japanese Patent Laid-Open Nos. 2000-63119, 2006-83033, and 2007-119617).

SUMMARY OF THE INVENTION

The present invention relates to:

[1] A Silicone Resin Composition Containing:
(i) a silicone resin and
(ii) fine metal oxide particles without having a reactive functional group or with a protected reactive functional group on the surface thereof (fine metal oxide particles B),
wherein the silicone resin is obtained by carrying out a polymerization reaction between
a silicone derivative having an alkoxysilyl group at an end of a molecule and a molecular weight of from 200 to 3000, and
fine metal oxide particles having a reactive functional group on the surface thereof (fine metal oxide particles A), and
wherein the fine metal oxide particles B are dispersed in the silicone resin;

[2] A Silicone Resin Composition Obtained by Carrying Out a Polymerization Reaction Between
a silicone derivative having a trifunctional alkoxysilyl group at an end of a molecule, and
fine metal oxide particles having a reactive functional group on the surface thereof,
wherein the silicone derivative contains two or more kinds of silicone derivatives each having a trifunctional alkoxysilyl group at an end of a molecule, and
wherein the silicone derivative is added in two or more divided stages in the presence of the fine metal oxide particles in the polymerization reaction;

[3] A Silicone Resin Composition Obtained by Carrying Out a Polymerization Reaction Between
a silicone derivative having an alkoxysilyl group at an end of a molecule or in a side chain thereof, and
fine metal oxide particles having a reactive functional group on the surface thereof,
wherein the alkoxysilyl group contains a silyl group having an alkoxy group and an aromatic group as functional groups directly bonded to a silicon atom;

[4] A Silicone Resin Sheet Formed by Applying the Silicone Resin Composition as Defined in Any One of the Above [1] to [3] on a Substrate, and Drying a Coating; and

[5] A Photosemiconductor Device Containing a Photosemiconductor Element Encapsulated with the Silicone Resin Composition As Defined in Any One of the Above [1] to [3].

DETAILED DESCRIPTION OF THE INVENTION

The present invention relates to a silicone resin composition having excellent transparency and a high refractive index, a method for producing the silicone resin composition, a sheet-like formed article made of the composition, and a photosemiconductor device encapsulated with the composition.

The silicone resin composition of the present invention exhibits excellent effects of having excellent transparency and a high refractive index.

These and other advantages of the present invention will be apparent from the following description.

In the method of Japanese Patent Laid-Open No. 2005-76003, if the amount of a phenyl group introduced becomes large, the resin becomes rigid and brittle, so that the method has some disadvantages in not only that the method is limited in its utilization, but also that transparency is lowered due to crystallization of the silicone resin itself if even a larger amount of the phenyl group is introduced.

If fine metal oxide particles dispersant disclosed in Japanese Patent Laid-Open No. 2006-131547 is used, although a thin film having a thickness of 10 μm or so can relatively maintain transparency, transparency is dramatically lowered when a film has a thickness larger than the above. A method of Japanese Patent Laid-Open No. Hei 9-208438 is disadvantageous in dispersion stability besides dispersibility.

In addition, in a case where a metal oxide is dispersed in a resin using a surface treatment agent in accordance with Japanese Patent Laid-Open Nos. 2000-63119, 2006-83033, and 2007-119617, a problem is caused that the aggregation of the particles takes place, thereby impairing transparency, if the compatibility between the surface treatment agent and the resin is not good. In addition, since the particles undergo changes in surface property caused by a slight environmental change such as a change in polarity, there is a disadvantage that it is difficult to homogenously carry out the surface treatment, thereby making it very difficult to handle. Further, the reactivity of the fine particle surface differs depending upon the kinds of the particles, and the reactivity of titanium oxide, zirconium oxide, or the like is lower than that of silica, so that there is a disadvantage that the effects are not exhibited in correspondence with the amount of the surface treatment agent added, and the like.

On the other hand, if the particles are dispersed in a hydrophobic silicone resin, the particles must be treated with a hydrophobic surface treatment agent in a large amount. There are, however, some disadvantages that these hydrophobic surface treatment agents generally have low refractive indices; when the surface treatment agents are used in large amounts, the refractive index of the overall particles is lowered, so that a significant effect of improving refractive index is not so exhibited even when the particles are dispersed in the resin. In addition, in a silicone resin having an aromatic group, the dispersion of the particles is even more difficult.

In addition, a general silane coupling agent has an organic functional group, as represented by an epoxy group or a methacryloyl group, in order to provide dispersibility. Since these organic functional groups are highly reactive, a resin containing particles that are surface-treated with a silane coupling agent or the like has poor heat resistance and light fastness, as compared to a resin containing a silicone alone.

Moreover, when metal oxide particles are dispersed in a resin in large amounts, the resulting resin composition becomes rigid and brittle, thereby making its handling difficult. If a molecular weight of a silicone resin is increased in order to improve moldability or processability, hydrophobicity of the resin increases, thereby generally making it even more difficult to disperse hydrophilic, high-refractive index fine metal oxide particles.

In view of the above, as a result of intensive studies in order to overcome the above disadvantages, the present inventors have found that a specified silicone derivative is reacted with fine metal oxide particles having a reactive functional group on the surface thereof, thereby making it possible to improve the dispersion of the fine particles, whereby a silicone resin composition having excellent transparency and a high refractive index is obtained. The present invention has been perfected thereby.

The silicone resin composition of the present invention is one that improves the dispersion of the fine particles by reacting a specified silicone derivative and fine metal oxide particles having a reactive functional group on the surface thereof (hereinafter also referred to as reactive fine metal oxide particles), and specific embodiments include the following three embodiments.

Embodiment 1: A Silicone Resin Composition Containing:
(i) a silicone resin and
(ii) fine metal oxide particles without having a reactive functional group or with a protected reactive functional group on the surface thereof (fine metal oxide particles B),
wherein the silicone resin is obtainable or obtained by carrying out a polymerization reaction between
   a silicone derivative having an alkoxysilyl group at an end of a molecule and a molecular weight of from 200 to 3000, and
   fine metal oxide particles having a reactive functional group on the surface thereof (fine metal oxide particles A), and
wherein the fine metal oxide particles B are dispersed in the silicone resin;

Embodiment 2: A Silicone Resin Composition Obtainable or Obtained by Carrying out a Polymerization Reaction Between
   a silicone derivative having a trifunctional alkoxysilyl group at an end of a molecule, and
   fine metal oxide particles having a reactive functional group on the surface thereof,
wherein the silicone derivative contains two or more kinds of silicone derivatives each having a trifunctional alkoxysilyl group at an end of a molecule, and
wherein the silicone derivative is added in two or more divided stages in the presence of the fine metal oxide particles in the polymerization reaction;

Embodiment 3: A Silicone Resin Composition Obtainable or Obtained by Carrying out a Polymerization Reaction Between
   a silicone derivative having an alkoxysilyl group at an end of a molecule or in a side chain thereof, and
   fine metal oxide particles having a reactive functional group on the surface thereof,
wherein the alkoxysilyl group contains a silyl group having an alkoxy group and an aromatic group as functional groups directly bonded to a silicon atom.

Here, the term "silicone resin composition" as used herein simply means a "silicone resin composition" or a "thermosetting silicone resin composition."

A silicone resin has hydrophobicity and high water repellency, so that it is difficult to disperse hydrophilic fine metal oxide particles. In view of the above, in the present invention, the dispersion of the fine metal oxide particles is improved by using a specified silicone resin. Specifically, the features of each of the embodiments will be explained.

A great feature of the silicone resin composition of Embodiment 1 is in that the silicon resin composition contains
(i) a silicone resin and
(ii) fine metal oxide particles without having a reactive functional group or with a protected reactive functional group on the surface thereof (fine metal oxide particles B), wherein the silicone resin is obtainable or obtained by carrying out a polymerization reaction between a silicone derivative having an alkoxysilyl group at an end of a molecule and a specified molecular weight, and fine metal oxide particles having a reactive functional group on the surface thereof (fine metal oxide particles A), and wherein the fine metal oxide particles B are dispersed in the silicone resin. Specifically, in Embodiment 1, the fine metal oxide particles A can be kept and dispersed in the silicone resin by reacting a silicone derivative having a reactive alkoxysilyl group at an end of a molecule, with fine metal oxide particles having a reactive functional group on the surface thereof (fine metal oxide particles A). However, if the amount of the fine metal oxide particles A contained is too large, the cross-linking degree of the resin becomes exceedingly high, so that the resulting composition becomes rigid and brittle. In view of the above, by further containing fine metal oxide particles without having a reactive functional group or with a protected reactive functional group on the surface thereof (fine metal oxide particles B), a silicone resin composition having excellent transparency and a high refractive index can be obtained. Here, the phrase "fine metal oxide particles with a protected reactive functional group" as used herein refers to fine metal oxide particles having a reactive functional group on the surface thereof in which those functional groups are in a protected state, so that the fine metal oxide particles cannot substantially be involved in the reaction due to steric hindrance or the like even if the reactive functional groups remain on the surface.

A great feature of the silicone resin composition of Embodiment 2 is in that a silicone resin composition is obtainable or obtained by carrying out a polymerization reaction between a silicone derivative having a trifunctional alkoxysilyl group at an end of a molecule, and fine metal oxide particles having a reactive functional group on the surface thereof, wherein the silicone derivative contains two or more kinds of silicone derivatives each having a trifunctional alkoxysilyl group at an end of a molecule, and wherein the silicone derivative is added in two or more divided stages in the presence of the fine metal oxide particles in the polymerization reaction. Specifically, in Embodiment 2, by using a silicone derivative having a reactive trifunctional alkoxysilyl group at an end of a molecule as a silicone resin, and further using fine metal oxide particles having a reactive functional group on the surface thereof as fine metal oxide particles, and subjecting both the silicone derivatives and the fine metal oxide particles to a polymerization reaction, the fine metal oxide particles can be dispersed in a state that the fine particles are bonded to a silicone resin. However, if all the functional groups of the silicone derivative are undesirably polymerized in a block with the fine metal oxide particles, the cross-linking via the fine metal oxide particles becomes large, so that the resulting composition becomes rigid and brittle. In view of the above, by carrying the polymerization reaction in two or more stages, the cross-linking degree can be adjusted, so that an excellent dispersion state of the fine metal oxide particles can be formed, whereby a silicone resin composition having excellent transparency and a high refractive index can be obtained.

A great feature of the silicone resin composition of Embodiment 3 is in that a silicone resin composition is obtainable or obtained by carrying out a polymerization reaction between a silicone derivative having an alkoxysilyl group at an end of a molecule or in a side chain thereof, and fine metal oxide particles having a reactive functional group on the surface thereof, wherein the alkoxysilyl group contains a silyl group having an alkoxy group and an aromatic group as functional groups directly bonded to a silicon atom. Specifically, in Embodiment 3, by reacting a silicone derivative having a reactive alkoxysilyl group at an end of a molecule or in a side chain thereof with fine metal oxide particles having a reactive functional group on the surface thereof, the fine metal oxide particles can be kept and dispersed in a silicone resin. However, if the amount of the fine metal oxide particles contained is too large, the cross-linking degree of the resin becomes exceedingly high, so that the resulting composition becomes rigid and brittle. In view of the above, by introducing an aromatic group besides an alkoxy group into a silicon atom of the alkoxysilyl group reacting with the fine metal oxide particles, the degree of cross-linking can be adjusted, so that an excellent dispersion state of the fine metal oxide particles can be formed, whereby a silicone resin composition having excellent transparency and a high refractive index can be obtained. Here, the phrase "directly bonded" as used herein means that the functional group is directly bonded to a silicon atom without mediating other atoms, meaning that each of the alkoxy group and the aromatic group is bonded to a silicon atom.

Specific constitutions of each of the embodiments will be explained hereinbelow.

The silicone resin composition of Embodiment 1 contains a silicone derivative, and fine metal oxide particles containing fine metal oxide particles having a reactive functional group on the surface thereof (hereinafter also referred to as fine metal oxide particles A), and fine metal oxide particles without having a reactive functional group or with a protected reactive functional group on the surface thereof (hereinafter also referred to as fine metal oxide particles B). The silicone derivative in Embodiment 1 has an alkoxysilyl group at an end of a molecule. It is preferable that the compound having an alkoxysilyl group at an end of a molecule contains at least one compound selected from the group consisting of bifunctional alkoxysilanes, trifunctional alkoxysilanes, and partially hydrolyzed condensates thereof, from the viewpoint of reactivity with the fine metal oxide particles A. Here, in the silicone derivative in Embodiment 1, the term "partially hydrolyzed condensates" means a product obtained by hydrolyzing a bifunctional alkoxysilane alone, a trifunctional alkoxysilane alone, or a mixture of a bifunctional alkoxysilane and a trifunctional alkoxysilane, and polycondensing the hydrolyzed alkoxysilanes, and the composition is not particularly limited.

It is preferable that the bifunctional alkoxysilane is a compound represented by the formula (I):

wherein each of $R^1$, $R^2$, $R^3$ and $R^4$ is independently an alkyl group or an aromatic group, with proviso that both of $R^3$ and $R^4$ are not aromatic groups concurrently.

Each of $R^1$, $R^2$, $R^3$ and $R^4$ in the formula (I) is independently an alkyl group or an aromatic group, with proviso that both of $R^3$ and $R^4$ are not aromatic groups concurrently. In other words, at least one of $R^3$ and $R^4$ is an alkyl group.

The alkyl group of $R^1$ and $R^2$ in the formula (I) has the number of carbon atoms of preferably from 1 to 18, more preferably from 1 to 12, and even more preferably from 1 to 6, from the viewpoint of controlling hydrophilicity/hydrophobicity on the surface of the fine particles, efficiency in polycondensation reaction of an alkoxysilane, and the like. Specific examples thereof include a methyl group, an ethyl group, a propyl group, an isopropyl group, and the like. Among them, it is preferable that each of $R^1$ and $R^2$ is independently a methyl group or an aromatic group.

The alkyl group of $R^3$ and $R^4$ in the formula (I) has the number of carbon atoms of preferably from 1 to 4, and more preferably from 1 to 2, from the viewpoint of reactivity on the surface of the fine particles and a rate of hydrolysis. Specific examples thereof include a methyl group, an ethyl group, and the like. Among them, it is preferable that both of $OR^3$ and $OR^4$ are methoxy groups.

The bifunctional alkoxysilane represented by the formula (I) includes diphenyldimethoxysilane, dimethyldimethoxysilane, dimethyldiethoxysilane, diphenyldiethoxysilane, diethyldimethoxysilane, diethyldiethoxysilane, diisopropyldimethoxysilane, diisopropyldiethoxysilane, methylphenyldimethoxysilane, methylphenyldiethoxysilane, and the like, and these bifunctional alkoxysilanes can be used alone or in a combination of two or more kinds. Among them, dimethyldimethoxysilane where both $R^1$ and $R^2$ are a methyl group, and both $OR^3$ and $OR^4$ are a methoxy group, and diphenyldimethoxysilane where both $R^1$ and $R^2$ are a phenyl group, and both $OR^3$ and $OR^4$ are a methoxy group are preferred.

As the bifunctional alkoxysilane represented by the formula (I), a synthesized product in accordance with a known method may be used, or a commercially available product may be used.

It is preferable that the trifunctional alkoxysilane is a compound represented by the formula (II):

wherein each of $R^5$, $R^6$ and $R^7$ is independently an alkyl group or aromatic group having 1 to 8 carbon atoms; $X^1$ is a monovalent organic group; n is an integer of from 0 to 3, with proviso that all of $R^5$, $R^6$ and $R^7$ are not aromatic groups concurrently.

Each of $R^5$, $R^6$ and $R^7$ in the formula (II) is independently an alkyl group or aromatic group having 1 to 8 carbon atoms, with proviso that all of $R^5$, $R^6$ and $R^7$ are not aromatic groups concurrently. Specifically, at least one of $R^5$, $R^6$ and $R^7$ is an alkyl group. It is preferable that the alkyl group has the number of carbon atoms of preferably from 1 to 8, more preferably from 1 to 6, and even preferably from 1 to 3, from the viewpoint of reactivity on the surface of the fine particles. Specific examples thereof include a methyl group, an ethyl group, a propyl group, an isopropyl group, a butyl group, a pentyl group, a hexyl group, and the like. Among them, it is preferable that each of $R^5$, $R^6$ and $R^7$ is a methyl group or an ethyl group.

$X^1$ in the formula (II) is a monovalent organic group, which can be various functional groups for giving physical properties depending upon the applications of silicone resin compositions dispersed with fine metal oxide particles. Specific examples include an alkyl group, a phenyl group, a glycidyl group, a vinyl group, an epoxycyclohexyl group, an amino group, a thiol group, and the like. In addition, these groups (for example, a glycidyl group) may optionally contain another atom, for example, an oxygen atom, or the like.

n in the formula (II) is preferably an integer of from 0 to 3, from the viewpoint of solubility in a solvent.

The trifunctional alkoxysilane represented by the formula (II) include 2-[(3,4)-epoxycyclohexyl]ethyltrimethoxysilane, 3-methacryloxypropyltrimethoxysilane, 3-glycidoxypropyltrimethoxysilane, phenyltrimethoxysilane, methyltrimethoxysilane, ethyltrimethoxysilane, propyltrimethoxysilane, hexyltrimethoxysilane, decyltrimethoxysilane, vinyltrimethoxysilane, 3-acryloxypropyltrimethoxysilane, N-(2-aminoethyl)-3-aminopropyltrimethoxysilane, 3-aminopropyltrimethoxysilane, (N-phenyl)-3-aminopropyltrimethoxysilane, 3-mercaptopropyltrimethoxysilane, 3-chloropropyltrimethoxysilane, 3-ureidopropyltrimethoxysilane, and the like, and these trifunctional alkoxysilanes can be used alone or in a combination of two or more kinds.

As the trifunctional alkoxysilane represented by the formula (II), a synthesized product in accordance with a known method may be used, or a commercially available product may be used.

In addition, as the partially hydrolyzed condensate in Embodiment 1, a synthesized product in accordance with a known method may be used, or a commercially available product, such as "X-40-9225" (molecular weight: 2000 to 3000, methoxy content: 24% by weight), "KR500" (molecular weight: 1000 to 2000, methoxy content: 28% by weight), or "KC89" (molecular weight: 300 to 500, methoxy content: 45% by weight), each commercially available from Shin-Etsu Chemical Co., Ltd., may be used.

The bifunctional alkoxysilane represented by the formula (I) in the silicone derivative of Embodiment 1 is contained in an amount of preferably from 10 to 60% by weight, more preferably from 10 to 50% by weight, and even more preferably from 10 to 30% by weight, from the viewpoint of accomplishment of a high refractive index, reaction efficiency on the surface of the fine particles, and efficiency of the polycondensation reaction of the alkoxysilanes themselves. The amount contained as referred to herein also includes an amount contained of the bifunctional alkoxysilane constituting a partially hydrolyzed condensate.

The trifunctional alkoxysilane represented by the formula (II) in the silicone derivative of Embodiment 1 is contained in an amount of preferably from 5 to 60% by weight, more preferably from 10 to 40% by weight, and even more preferably from 20 to 40% by weight, from the viewpoint of controlling the physical properties of the silicone resin composition dispersed with fine metal oxide particles. The amount contained as referred to herein also includes an amount contained of the trifunctional alkoxysilane constituting a partially hydrolyzed condensate.

The silicone derivative in Embodiment 1 has a molecular weight of from 200 to 3000, preferably from 300 to 3000, and more preferably from 600 to 2800. Here, in a case where two or more alkoxysilanes are used, it is desired that the molecular weight of each of the alkoxysilanes is within the range mentioned above, and those having a molecular weight outside the above range may be contained, so long as a weighted average molecular weight falls within the above range as a molecular weight of the entire silicone derivative. In the present specification, the molecular weight of the silicone derivative is measured according to gel permeation chromatography (GPC).

In addition, an alkoxy group of the silicone derivative in Embodiment 1 is contained in an amount of preferably from 11 to 50% by weight, and more preferably from 15 to 46% by weight, per one molecule of the silicone derivative. Here, in a case where two or more alkoxysilanes are used, it is desired that the alkoxy group content of each of the alkoxysilanes falls within the range mentioned above, and those having a content outside the above range may be included, so long as a weighted average alkoxy group content falls within the above range as an alkoxy group content of the entire silicone derivative. In the present specification, the alkoxy group content can be obtained from the quantification according to $^1$H-NMR and a weight loss due to heating.

The silicone resin composition in Embodiment 2 contains a silicone derivative having a trifunctional alkoxysilyl group at an end of a molecule, and fine metal oxide particles having a reactive functional group on the surface thereof.

It is preferable that the silicone derivative having a trifunctional alkoxysilyl group at an end of a molecule in Embodiment 2, in other words, a trifunctional alkoxysilane, is a compound represented by the formula (III):

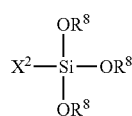

wherein OR$^8$ is an alkoxy group, wherein R$^8$ is a linear or branched alkyl group having 1 to 4 carbon atoms; X$^2$ is a linear or branched alkyl group having 1 to 12 carbon atoms, which may contain a heteroatom at an end, or may contain an epoxy group, a primary, secondary, or tertiary amino group, a (meth)acryloyl group, a cyclohexylepoxy group, or an aromatic group at an end.

OR$^8$ in the formula (III) is an alkoxy group, wherein R$^8$ is a linear or branched alkyl group having 1 to 4 carbon atoms. The number of carbon atoms of R$^8$ is preferably from 1 to 4, and more preferably from 1 to 2, from the viewpoint of reactivity on the surface of the fine particles and hydrolytic rate. Specific examples include a methyl group, an ethyl group, a propyl group, an isopropyl group, a butyl group, and the like. Among them, it is preferable that R$^8$ is a methyl group or an ethyl group.

X$^2$ in the formula (III) is a linear or branched alkyl group having 1 to 12 carbon atoms, which may contain a heteroatom at an end, or may contain an epoxy group, a primary, secondary, or tertiary amino group, a (meth)acryloyl group, a cyclohexylepoxy group, or an aromatic group at an end. Here, the term "(meth)acryloyl" as used herein is a generic term for both methacryloyl and acryloyl.

The trifunctional alkoxysilane represented by the formula (III) include 2-[(3,4)-epoxycyclohexyl]ethyltrimethoxysilane, 3-methacryloxypropyltrimethoxysilane, 3-glycidoxypropyltrimethoxysilane, phenyltrimethoxysilane, methyltrimethoxysilane, ethyltrimethoxysilane, propyltrimethoxysilane, hexyltrimethoxysilane, decyltrimethoxysilane, vinyltrimethoxysilane, 3-acryloxypropyltrimethoxysilane, N-(2-aminoethyl)-3-aminopropyltrimethoxysilane, 3-aminopropyltrimethoxysilane, (N-phenyl)-3-aminopropyltrimethoxysilane, 3-mercaptopropyltrimethoxysilane, 3-chloropropyltrimethoxysilane, 3-ureidopropyltrimethoxysilane, and the like, and these trifunctional alkoxysilanes can be used alone or in a combination of two or more kinds.

In Embodiment 2, the polymerization reaction of fine metal oxide particles and a silicone derivative is carried out over two or more stages, from the viewpoint of reactivity with the fine metal oxide particles. More specifically, the polymerization reaction is carried out by adding a silicone derivative in two or more divided stages, in the presence of fine metal oxide particles. The silicone derivative to be added in the stages of each of polymerization reactions may be identical or different. Since the surface of the fine metal oxide particles is highly hydrophilic, a low-molecular weight, trifunctional alkoxysilane having a molecular weight of 160 or less is preferred as a first-stage silicone derivative, from the viewpoint of efficiently allowing to react with the surface of the fine particles in a highly polar solvent, such as a mixed solvent of water and an alcohol, and a trifunctional alkoxysilane having a molecular weight of from 120 to 160, such as methyltrimethoxysilane or ethyltrimethoxysilane, is preferred, from the viewpoint of high solubility and a high refractive index. The trifunctional alkoxysilane to be polymerized with the fine metal oxide particles in the second-stage polymerization reaction includes alkoxysilanes having a relatively high hydrophobicity, such as compounds in which X$^2$ in the formula (III) is a substituent having 3 or more carbon atoms, of the compounds represented by the formula (III).

The trifunctional alkoxysilane used in the second-stage polymerization reaction has a refractive index of preferably 1.39 or more, and more preferably 1.40 or more, from the viewpoint of a high refractive index of the resulting resin composition. Here, in the present specification, the refractive index is measured by a method described in Examples set forth below.

As the trifunctional alkoxysilane represented by the formula (III), a synthesized product in accordance with a known method may be used, or a commercially available product, such as methyltrimethoxysilane "KBM13," phenyltrimethoxysilane "KBM103," hexyltrimethoxysilane "KBM3063," vinyltrimethoxysilane "KBM1003," 2-(3,4-epoxycyclohexyl)ethyltrimethoxysilane "KBM303," 3-glycidoxypropyltrimethoxysilane "KBM403," p-styryltrimethoxysilane "KBM1403," 3-methacryloxypropyltrimethoxysilane "KBM503," 3-acryloxypropyltrimethoxysilane "KBM5103," N-2-(aminoethyl)-3-aminopropyltrimethoxysilane "KBM603," 3-aminopropyltrimethoxysilane "KBM903," N-phenyl-3-aminopropyltrimethoxysilane "KBM573," 3-mercaptopropyltrimethoxysilane "KBM803," decyltrimethoxysilane "KBM3103C," and ethyltrimethoxysilane "LS-890," each commercially available from Shin-Etsu Chemical Co., Ltd., may be used.

The silicone resin composition of Embodiment 3 contains a silicone derivative having an alkoxysilyl group at an end of a molecule or in a side chain thereof, and fine metal oxide particles having a reactive functional group on the surface thereof.

The silicone derivative having an alkoxysilyl group at an end of a molecule or in a side chain thereof in Embodiment 3 is a derivative containing an alkoxysilyl group at an end of a molecule or a side chain thereof, wherein the alkoxysilyl group contains a silyl group having an alkoxy group and an aromatic group directly bonded to a silicon atom.

It is preferable that the silicone derivative having the above structure contains at least one compound selected from the group consisting of a bifunctional alkoxysilane represented by the formula (IV):

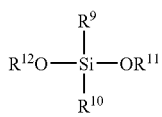

(IV)

wherein each of $R^9$, $R^{10}$, $R^{11}$ and $R^{12}$ is independently an alkyl group or an aromatic group, with proviso that both of $R^9$ and $R^{10}$ are not alkyl groups concurrently, and that both of $R^{11}$ and $R^{12}$ are not aromatic groups concurrently (hereinafter also referred to as an aromatic group-containing bifunctional alkoxysilane);
a trifunctional alkoxysilane represented by the formula (V):

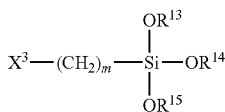

(V)

wherein each of $R^{13}$, $R^{14}$ and $R^{15}$ is independently an alkyl group or an aromatic group having 1 to 8 carbon atoms; $X^3$ is an aromatic group; m is an integer of from 0 to 3, with proviso that all of $R^{13}$, $R^{14}$ and $R^{15}$ are not aromatic groups concurrently (hereinafter referred to as an aromatic group-containing trifunctional alkoxysilane); and partially hydrolyzed condensates thereof. Here, in the silicone derivative in Embodiment 3, a partially hydrolyzed condensate refers to a product obtained by hydrolyzing aromatic group-containing bifunctional alkoxysilanes alone, aromatic group-containing trifunctional alkoxysilanes alone, or a mixture of an aromatic group-containing bifunctional alkoxysilane and an aromatic group-containing trifunctional alkoxysilane, and polycondensing the hydrolyzed alkoxysilanes, and its composition is not particularly limited.

Each of $R^9$, $R^{10}$, $R^{11}$ and $R^{12}$ in the formula (IV) is independently an alkyl group or an aromatic group, with proviso that both of $R^9$ and $R^{10}$ are not alkyl groups concurrently, and that both of $R^{11}$ and $R^{12}$ are not aromatic groups concurrently. Specifically, at least one of $R^9$ and $R^{10}$ is an aromatic group, and at least one of $R^{11}$ and $R^{12}$ is an alkyl group.

The alkyl group of $R^9$ and $R^{10}$ in the formula (IV) has the number of carbon atoms of preferably from 1 to 18, more preferably from 1 to 12, and even more preferably from 1 to 6, from the viewpoint of controlling hydrophilicity/hydrophobicity on the surface of the fine particles, efficiency in polycondensation reaction of an alkoxysilane, and the like. Specific examples thereof include a methyl group, an ethyl group, a propyl group, an isopropyl group, and the like. Among them, it is preferable that one of $R^9$ and $R^{10}$ is a methyl group, and the other is an aromatic group, and it is more preferable that both are aromatic groups, from the viewpoint of a high refractive index.

The alkyl group of $R^{11}$ and $R^{12}$ in the formula (IV) has the number of carbon atoms of preferably from 1 to 4, and more preferably from 1 to 2, from the viewpoint of reactivity on the surface of the fine particles and a rate of hydrolysis. Specific examples thereof include a methyl group, an ethyl group, and the like. Among them, it is preferable that both of $OR^{11}$ and $OR^{12}$ are methoxy groups.

The aromatic group-containing bifunctional alkoxysilane represented by the formula (IV) includes diphenyldimethoxysilane, diphenyldiethoxysilane, methylphenyldimethoxysilane, methylphenyldiethoxysilane, and the like. These aromatic group-containing bifunctional alkoxysilanes can be used alone or in a combination of two or more kinds. Among them, diphenyldimethoxysilane where both $R^9$ and $R^{10}$ are a phenyl group, and both $OR^{11}$ and $OR^{12}$ are a methoxy group, is preferred.

As the aromatic group-containing bifunctional alkoxysilane represented by the formula (IV), a synthesized product in accordance with a known method may be used, or a commercially available product, such as diphenyldimethoxysilane "KBM202SS" (molecular weight: 244, methoxy content: 25% by weight), commercially available from Shin-Etsu Chemical Co., Ltd., may be used.

In the formula (V), each of $R^{13}$, $R^{14}$ and $R^{15}$ is independently an alkyl group or an aromatic group having 1 to 8 carbon atoms; $X^3$ is an aromatic group; m is an integer of from 0 to 3, with proviso that all of $R^{13}$, $R^{14}$ and $R^{15}$ are not aromatic groups concurrently. In other words, at least one of $R^{13}$, $R^{14}$ and $R^{15}$ is an alkyl group.

The alkyl group of $R^{13}$, $R^{14}$ and $R^{15}$ in the formula (V) has the number of carbon atoms of preferably from 1 to 8, more preferably from 1 to 6, and even preferably from 1 to 3, from the viewpoint of reactivity on the surface of the fine particles. Specific examples thereof include a methyl group, an ethyl group, a propyl group, an isopropyl group, a butyl group, a pentyl group, a hexyl group, and the like. Among them, it is preferable that each of $R^{13}$, $R^{14}$ and $R^{15}$ is a methyl group or an ethyl group.

$X^3$ in the formula (V) includes an aromatic group, for example, a phenyl group, for the purpose of giving the physical properties depending upon the applications of the silicone resin composition dispersed with fine metal oxide particles. Here, the aromatic group may contain optionally other atoms, for example, oxygen atoms, and the like.

m in the formula (V) is preferably an integer of from 0 to 3, from the viewpoint of solubility in a solvent.

The aromatic group-containing trifunctional alkoxysilane represented by the above formula (V) includes phenyltrimethoxysilane, N-phenyl-γ-aminopropyltrimethoxysilane, and the like. These aromatic group-containing trifunctional alkoxysilanes can be used alone or in a combination of two or more kinds.

As the aromatic group-containing trifunctional alkoxysilane represented by the formula (V), a synthesized product in accordance with a known method may be used, or a commercially available product may be used.

As the partially hydrolyzed condensates in Embodiment 3, a synthesized product in accordance with a known method may be used, or a commercially available product, such as "KR213" (molecular weight: 200 to 600, methoxy content: 20% by weight), "KR9218" (molecular weight: 500 to 1000, methoxy content: 15% by weight), "KR510" (molecular weight: 400 to 1000, methoxy content: 17% by weight), "KR217" (molecular weight: 200 to 1000, methoxy content: 25% by weight), "X-40-9225" (molecular weight: 2000 to 3000, methoxy content: 24% by weight), "KR500" (molecular weight: 1000 to 2000, methoxy content: 28% by weight), or "KC89" (molecular weight: 300 to 500, methoxy content: 45% by weight), each commercially available from Shin-Etsu Chemical Co., Ltd., may be used.

The aromatic group-containing bifunctional alkoxysilane represented by the formula (IV) in the silicone derivative of Embodiment 3 is contained in an amount of preferably from 10 to 60% by weight, more preferably from 20 to 50% by weight, and even more preferably from 20 to 30% by weight, from the viewpoint of accomplishment of a high refractive index, reaction efficiency on the surface of the fine particles, and efficiency of the polycondensation reaction of the alkoxysilanes themselves. The amount contained as referred to herein also includes an amount contained of the aromatic group-containing bifunctional alkoxysilane constituting a partially hydrolyzed condensate.

The aromatic group-containing trifunctional alkoxysilane represented by the formula (V) in the silicone derivative of Embodiment 3 is contained in an amount of preferably from 5 to 60% by weight, more preferably from 10 to 40% by weight, and even more preferably from 20 to 40% by weight, from the viewpoint of controlling the physical properties of the silicone resin composition dispersed with fine metal oxide particles. The amount contained as referred to herein also includes an amount contained of the aromatic group-containing trifunctional alkoxysilane constituting a partially hydrolyzed condensate.

The silicone derivative in Embodiment 3 has a molecular weight of preferably from 200 to 3000. Here, in a case where two or more alkoxysilanes are used, it is desired that the molecular weight of each of the alkoxysilanes is within the range mentioned above, and those having a molecular weight outside the above range may be contained, so long as a weighted average molecular weight falls within the above range as a molecular weight of the entire silicone derivative.

In addition, an alkoxy group of the silicone derivative in Embodiment 3 is contained in an amount of preferably from 11 to 50% by weight, and more preferably from 15 to 50% by weight, per one molecule of the silicone derivative. Here, in a case where two or more alkoxysilanes are used, it is desired that the alkoxy group content of each of the alkoxysilanes falls within the range mentioned above, and those having a content outside the above range may be included, so long as a weighted average alkoxy group content falls within the above range as an alkoxy group content of the entire silicone derivative.

In the present invention, the silicone resin composition may contain a silicone derivative other than those mentioned above, within the range that would not impair the effects of the present invention. Other silicone derivatives include known silicone derivatives.

Next, the fine metal oxide particles will be explained.

The fine metal oxide particles having a reactive functional group on the surface thereof in Embodiments 1 to 3, in other word, fine reactive metal oxide particles or fine metal oxide particles A in Embodiment 1 include those made of titanium oxide, zirconium oxide, barium titanate, zinc oxide, zinc titanate, silicon dioxide, and the like. These fine metal oxide particles can be used alone or in a combination of two or more kinds. Among them, it is desired that the fine metal oxide particles are made of at least one member selected from the group consisting of titanium oxide, zinc oxide, zirconium oxide, barium titanate, and silicon dioxide, from the viewpoint of high refractive index. As the titanium oxide, either a rutile type titanium oxide or an anatase type titanium oxide may be used.

Examples of the reactive functional group in the fine reactive metal oxide particles are a hydroxyl group, an isocyanate group, an amino group, a mercapto group, a carboxyl group, an epoxy group, a vinyl unsaturated group, a halogen group, an isocyanurate group, and the like. The reactive functional group exists in that state on the surface of the fine particles of the fine reactive metal oxide particles.

The amount of the reactive functional group contained in the fine reactive metal oxide particles on the surface thereof can be obtained depending upon an amount of the fine particles, surface area of the fine particles, an amount of a reacted surface treatment agent or the like. In the present invention, fine particles satisfying that an amount of the reactive functional group reacted with the surface treatment agent is 0.1% by weight or more of the weight of the fine particles are referred to as "fine metal oxide particles having a reactive functional group on the surface thereof." Here, the amount reacted is regarded as an amount of a reactive functional group contained, and the amount of the reactive functional group contained is not particularly limited, so long as the amount is 0.1% by weight or more. Here, in the present specification, the amount of the reactive functional group contained in the fine metal oxide particles on the surface thereof can be measured in accordance with a method described in Examples set forth below, and the phrase "the amount of the reactive functional group contained" means "amount contained" and/or "existing amount" of the reactive functional group.

In addition, the amount of the reactive functional group contained in the fine reactive metal oxide particles on the surface thereof can be lowered by, for example, reacting the fine particles with a solution prepared by dissolving methyltrimethoxysilane in an organic solvent. In addition, the amount of the reactive functional group contained on the surface of the fine particles can be lowered by baking the fine particles at a high temperature.

As the fine reactive metal oxide particles, those produced according to a known method can be used. Among them, those obtained according to at least one production methods selected from the group consisting of a hydrothermal synthesis method, a sol-gel method, a supercritical hydrothermal synthesis method, a co-precipitation method, and a homogenous precipitation method are preferred, from the viewpoint of evenness of the sizes of the particles and formation of the fine particles.

The fine reactive metal oxide particles have an average particle size of preferably from 1 to 100 nm, more preferably from 1 to 70 nm, and even more preferably from 1 to 20 nm, from the viewpoint of transparency of a formed article made of the resulting composition. In the present specification, the average particle size of the fine metal oxide particles can be measured in accordance with a particle size measurement of a dispersion of particles by dynamic light scattering method, or a direct observation with a Transmission Electron Microscope.

Here, as the fine reactive metal oxide particles, those prepared in a dispersion may be used, from the viewpoint of inhibiting aggregation, which is also referred to as "a dispersion of the fine metal oxide particles" or "a dispersion of fine metal oxide particles A." The dispersion medium includes water, alcohols, ketone solvents, acetamide solvents, and the like. It is preferable to use water, methanol, methyl butyl ketone, or dimethylacetamide. The amount of the fine metal oxide particles (solid content) in the dispersion is preferably from 10 to 40% by weight, more preferably from 20 to 40% by weight, and even more preferably from 30 to 40% by weight, from the viewpoint of efficiently carrying out a reaction on the surface of the fine particles. As the dispersion of fine metal oxide particles, for example, commercially available products of a dispersion of fine titanium oxide particles of NEOSUNVEIL or QUEEN TITANIC Series commercially available from Catalyst & Chemicals Ind. Co., Ltd. (CCIC), or Tynoc commercially available from Taki Chemical Co., Ltd.; a dispersion of fine zirconium oxide particles of ZSL Series commercially available from Daiichi Kigenso Kagaku Kogyo Co., Ltd., NZD Series commercially available from Sumitomo Osaka Cement Co., Ltd., or Nano-Use Series commercially available from Nissan Chemical Industries, Ltd. can be used.

In addition, in Embodiment 1, in addition to the above fine reactive metal oxide particles (fine metal oxide particles A), fine metal oxide particles without having a reactive functional group or with a protected reactive functional group on the surface thereof (fine metal oxide particles B) are used. The fine metal oxide particles B do not contain a reactive functional group, or even if contained, contain a functional group in a protected state. The surface of the fine particles of the fine metal oxide particles B may contain an unprotected reactive functional group, to an extent that would not increase a cross-linking degree of the resulting composition caused by an interaction between the fine metal oxide particles B and the silicone derivative.

The fine metal oxide particles B include those made of titanium oxide, zirconium oxide, barium titanate, zinc oxide, zinc titanate, silicon dioxide, and the like. These fine metal oxide particles can be used alone or in a combination of two or more kinds. Among them, it is desired that the fine metal oxide particles B are made of at least one member selected from the group consisting of titanium oxide, zinc oxide, zirconium oxide, barium titanate, and silicon dioxide, from the viewpoint of a high refractive index. As the titanium oxide, either a rutile type titanium oxide or an anatase type titanium oxide may be used.

Examples of the reactive functional group in the fine metal oxide particles B are a hydroxyl group, an isocyanate group, an amino group, a mercapto group, a carboxyl group, an epoxy group, a vinyl unsaturated group, a halogen group, an isocyanurate group, and the like. The reactive functional group does not exist on the surface of the fine particles of the fine metal oxide particles B, and even if they exist, the reactive functional group is in a protected state, and does not have reactivity. Here, a method for protecting a reactive functional group is not particularly limited, and the method can be carried out in accordance with a known method.

The amount of the reactive functional group contained in the fine metal oxide particles B on the surface thereof in the fine metal oxide particles B can be obtained in the same manner as those for the above fine reactive metal oxide particles. Here, it is preferable that the amount reacted with the surface treatment agent is less than 0.1% by weight, and substantially 0% by weight.

The amount of the reactive functional group contained in the fine metal oxide particles B on the surface thereof can be lowered by, for example, reacting the fine particles with a solution prepared by dissolving methyltrimethoxysilane in an organic solvent, in the same manner as in the above fine reactive metal oxide particles. In addition, the amount of the reactive functional group on the surface of the fine particles can be lowered by baking the fine particles at a high temperature.

The fine metal oxide particles B have an average particle size of preferably from 1 to 100 nm, more preferably from 1 to 70 nm, and even more preferably from 1 to 20 nm, from the viewpoint of obtaining excellent transparency even in a state where the fine particles are dispersed in a resin in a high concentration.

In addition, as the fine metal oxide particles B, those prepared by dispersing the fine particles in a dispersion may be used, in the same manner as in fine reactive metal oxide particles. As commercially available products of the fine metal oxide particles B, rutile type titanium oxides commercially available from ISHIHARA SANGYO KAISHA, LTD. under the trade names of "TTO-51A" and "V-3," and STR-60 Series and STR-100 Series commercially available from Sakai Chemical Industry Co., Ltd.; and a methyl isobutyl ketone dispersion of anatase type titanium oxides "ELCOMNT" commercially available from Catalyst & Chemicals Ind. Co., Ltd., and the like can be used.

The fine reactive metal oxide particles in Embodiment 1, in other words, the fine metal oxide particles A, are contained in an amount of preferably from 1 to 70 parts by weight, more preferably from 10 to 60 parts by weight, and even more preferably from 10 to 50 parts by weight, based on 100 parts by weight of the silicone derivative.

The fine metal oxide particles B in Embodiment 1 are contained in an amount of preferably from 1 to 70 parts by weight, more preferably from 10 to 60 parts by weight, and even more preferably from 10 to 40 parts by weight, based on 100 parts by weight of the silicone derivative.

In addition, the weight ratio of the fine metal oxide particles A and the fine metal oxide particles B in Embodiment 1, i.e. A/B, is not particularly limited, so long as the composition of the present invention can be applied to a substrate in a sheet-like form.

The fine reactive metal oxide particles in Embodiment 2 are contained in an amount of preferably from 1 to 70 parts by weight, more preferably from 10 to 60 parts by weight, and even more preferably from 20 to 50 parts by weight, based on 100 parts by weight of the silicone derivative.

The fine reactive metal oxide particles in Embodiment 3 are contained in an amount of preferably from 1 to 70 parts by weight, more preferably from 1 to 60 parts by weight, and even more preferably from 1 to 30 parts by weight, based on 100 parts by weight of the silicone derivative.

In the present invention, the composition may contain other fine metal oxide particles besides the fine reactive metal oxide particles (the fine metal oxide particles A) and the fine metal oxide particles B mentioned above, within the range that would not impair the effects of the present invention. Other fine metal oxide particles include known fine metal oxide particles. A total amount of the fine metal oxide particles A and B contained in Embodiment 1, or an amount of the fine reactive metal oxide particles contained in Embodiments 2 and 3, is preferably 80% by weight or more, more preferably 90% by weight or more, and even more preferably substantially 100% by weight, of a total amount of the fine metal oxide particles used.

Besides the silicone derivative and the fine metal oxide particles mentioned above, the silicone resin composition of the present invention may contain an additive, such as an anti-aging agent, a modifying agent, a surfactant, a dye, a pigment, a discoloration preventive, or an ultraviolet absorbent, within the range that would not impair the effects of the present invention. The silicone resin composition of Embodiment 1 can be prepared by, for example, subjecting a polymerization reaction of a resin solution containing a silicone derivative in Embodiment 1 with a dispersion of fine metal oxide particles A mentioned above at 40° to 70° C., and thereafter dispersing fine metal oxide particles B in the resulting reaction mixture. Alternatively, the silicone resin composition may be prepared by previously mixing a liquid dispersion prepared by dispersing fine metal oxide particles B in a silicone derivative, with a dispersion of fine metal oxide particles A, and thereafter subjecting the mixture to a polymerization reaction.

The silicone resin composition of Embodiment 2 can be prepared by, for example, mixing the above dispersion of fine metal oxide particles with a resin solution containing a trifunctional alkoxysilane having a molecular weight of 160 or less at 40° to 80° C., distilling off a low-boiling point solvent of 100° C. or less, and carrying out a reaction at 100° to 110° C. for 10 to 60 minutes (a first-stage polymerization reaction) to give a reaction mixture, and further subjecting the reaction mixture to a polymerization reaction with a resin solution containing a trifunctional alkoxysilane having a refractive index of 1.39 or more at 40° to 80° C. (a second-stage polymerization reaction). Here, it is preferable that as the resin solution in the first-stage polymerization reaction, a solution prepared by dissolving a trifunctional alkoxysilane in a water/alcohol mixed solvent is prepared, a weight ratio of water to alcohol being preferably from 1/1 to 1/3, from the viewpoint of hydrophilicity of the surface of the fine metal oxide particles, and that as the resin solution in the second-stage polymerization reaction, a solution prepared by dissolving a trifunctional alkoxysilane in an alcohol and/or an ether is prepared, from the viewpoint of solubility and reactivity of the trifunctional alkoxysilane.

The silicone resin composition of Embodiment 3 can be prepared by, for example, carrying out a polymerization reaction of the above dispersion of fine metal oxide particles with a resin solution containing a silicone derivative of Embodiment 3 at 40° to 80° C. Specifically, for example, a resin solution prepared by dissolving a silicone derivative in an organic solvent such as methanol, ethanol, 2-propanol, or tetrahydrofuran, so as to have a concentration of preferably from 20 to 50% by weight is added dropwise to a solution prepared by adding an organic solvent such as methanol, ethanol, 2-methoxyethanol, 2-propanol, or tetrahydrofuran to a dispersion of fine metal oxide particles while stirring, and the reaction mixture is allowed to react at 40° to 80° C. for 1 to 3 hours, whereby a silicone resin composition can be prepared.

In addition, the resulting silicone resin composition is applied over a release sheet of which surface is subjected to removal treatment (for example, polyethylene substrate) in an appropriate thickness according to a method such as casting, spin-coating, or roll-coating, and dried at a temperature so as to enable removal of the solvent, whereby the silicone resin composition can be molded into a sheet-like form. Therefore, the present invention provides a sheet-like silicone resin formed article (silicone resin sheet), obtained or obtainable by applying a silicone resin composition of the present invention to a substrate, and drying a coating. Examples of the sheet-like formed article include those having a thickness of from 10 to 1000 μm or so. Here, a temperature for drying a resin solution cannot be unconditionally determined because the temperature differs depending upon the kinds of the resins and the solvents, the temperature for drying is preferably from 80° to 150° C. In addition, the drying procedures can be carried out in two divided stages, and in that case, it is preferable that the temperature for a first-stage drying is from 90° to 120° C., and that the temperature for a second-stage drying is from 130° to 150° C.

The silicone resin composition of the present invention has excellent transparency, so that the silicone resin composition has a high light transmittance. For example, when the silicone resin composition is molded into a sheet-like form having a thickness of from 10 to 500 μm, transmittance against an incidence of light having a wavelength of from 400 to 700 nm is preferably 80% or more, more preferably from 82% or more, even more preferably 85% or more, even more preferably from 85 to 100%, and even more preferably from 90 to 100%. Here, light transmittance as used herein is measured in accordance with the method described in Examples set forth below.

In addition, the refractive index of the silicone resin composition of the present invention is such that in a case where the silicone resin composition is molded into a sheet-like form having a thickness of from 10 to 500 μm, the refractive index of the silicone resin composition of Embodiment 1 is preferably from 1.56 to 1.65, that of the silicone resin composition of Embodiment 2 is preferably from 1.40 to 1.62, more preferably from 1.42 to 1.62, and even more preferably from 1.44 to 1.62, and that of the silicone resin composition of Embodiment 3 is preferably from 1.40 to 1.65, more preferably from 1.50 to 1.65, and even more preferably from 1.55 to 1.65. Here, the refractive index as used herein is measured in accordance with a method described in Examples set forth below.

A preferred method for producing a silicone resin composition of Embodiment 1 is a method including the steps of carrying out a polymerization reaction between a silicone derivative and fine metal oxide particles A [hereinafter referred to as step (1-1)], and dispersing fine metal oxide particles B in a product obtained in the step (1-1) [hereinafter referred to as step (1-2)].

Specific examples of the step (1-1) include the steps of, for example, adding a resin solution prepared by dissolving a silicone derivative in an organic solvent such as methanol, ethanol, 2-propanol, or tetrahydrofuran so as to have a concentration of preferably from 20 to 50% by weight, dropwise while mixing to a liquid mixture prepared by adding an organic solvent such as methanol, ethanol, 2-methoxyethanol, 2-propanol, or tetrahydrofuran to a dispersion of fine metal oxide particles A while stirring, and reacting the reaction mixture at 40° to 70° C. for 0.5 to 3 hours, and the like.

Specific examples of the step (1-2) include the steps of cooling a reaction mixture obtained in the step (1-1) to room temperature, distilling off a solvent under a reduced pressure to concentrate the mixture, adding an organic solvent such as methanol or 2-propanol while stirring to provide a homogeneous resin solution, adding fine metal oxide particles B thereto, and stirring the resulting mixture with a beads-mill for 0.5 to 3 hours to disperse, and the like. Here, the reaction mixtures obtained in the step (1-1) and the step (1-2) are subjected to a step of distilling off a solvent under a reduced pressure to concentrate the mixtures, and the like, whereby the concentrations and the viscosities of the mixtures can be appropriately adjusted.

A preferred method for producing a silicone resin composition of Embodiment 2 is a method of including the steps of carrying out a polymerization reaction between a trifunctional alkoxysilane having a molecular weight of 160 or less and fine reactive metal oxide particles [hereinafter referred to as the step (2-1)], and further carrying out a polymerization reaction between a product obtained in the step (2-1) and a trifunctional alkoxysilane having a refractive index of 1.39 or more until a ratio of reaction reaches 20 to 70% [hereinafter referred to as the step (2-2)]. Here, the ratio of reaction (%) as used herein refers to a ratio of reaction at a point of the termination of the polymerization reaction of the silicone derivative and the fine reactive metal oxide particles. Specifically, for example, a weight change before and after allowing a reaction mixture to stand in an oven at 150° C. for 3 hours is measured, and whereby a ratio of reaction is calculated by the formula:

[amount of generated reaction water (mol)/theoretical amount of generated water (mol)]×100.

Specific examples of the step (2-1) include the steps of, for example, adding an organic solvent such as methanol or 2-methoxyethanol to a dispersion of fine reactive metal oxide particles, while stirring to provide a liquid mixture, and adding to the liquid mixture a resin solution prepared by dissolving a trifunctional alkoxysilane having a molecular weight of 160 or less in an alcohol such as methanol, ethanol, 2-propanol, or 2-methoxyethanol, so as to have a concentration of preferably from 20 to 50% by weight, dropwise while mixing at 40° to 80° C., and reacting a mixture at 100° to 110° C. for 10 to 60 minutes.

Specific examples of the step (2-2) include the steps of, for example, adding to the polymer obtained in the step (2-1) a resin solution prepared by dissolving a trifunctional alkoxysilane having a refractive index of 1.39 or more in an organic solvent such as 2-propanol, tetrahydrofuran, or dimethoxyethane, so as to have a concentration of preferably from 20 to 50% by weight, dropwise while mixing, reacting the components at 40° to 80° C., for 0.2 to 2 hours, and finally carrying out a polymerization reaction of the components so that a ratio of reaction reaches 20 to 70%, and the like. Here, the reaction mixtures obtained in the step (2-1) and the step (2-2) are subjected to a step of distilling off a solvent under a reduced pressure to concentrate the mixtures, whereby the concentrations and the viscosities of the mixtures can be appropriately adjusted.

A preferred method for producing a silicone resin composition of Embodiment 3 is a method including the step of carrying out a polymerization reaction between a silicone derivative and fine reactive metal oxide particles [step (3-1)].

Specific examples of the step (3-1) include, for example, the step of adding a resin solution prepared by dissolving a silicone derivative in an organic solvent such as methanol, ethanol, 2-propanol, or tetrahydrofuran, so as to have a concentration of preferably from 20 to 50% by weight, dropwise while mixing to a liquid mixture prepared by adding an organic solvent such as methanol, ethanol, 2-methoxyethanol, 2-propanol, or tetrahydrofuran to a dispersion of fine reactive metal oxide particles while stirring, and reacting the components at 40° to 80° C. for 1 to 3 hours, and the like. Here, the resulting reaction mixtures are subjected to a step of distilling off a solvent under a reduced pressure to concentrate, or the like, and whereby the concentrations and the viscosities of the mixtures can be adjusted.

The silicone resin composition thus obtained has high light transmittance and a high refractive index, so that the silicone resin composition can be suitably used as, for example, photosemiconductor element encapsulating materials usable for photosemiconductor devices mounted with blue or white LED elements (backlights for liquid crystal displays, traffic lights, outdoor big displays, advertisement sign boards, and the like). Therefore, the present invention also provides a photosemiconductor device containing a photosemiconductor element encapsulated with the above silicone resin composition.

The photosemiconductor device of the present invention can be produced by encapsulating, for example, LED elements with the above silicone resin composition as photosemiconductor element encapsulating materials. Specifically, a photosemiconductor device can be produced by directly applying a silicone resin composition of the present invention in an appropriate thickness to a substrate mounted with LED elements according to any methods such as casting, spin-coating, roll-coating or the like, and heating and drying the coating, or laminating the silicone resin sheet of the present invention and pressing.

The photosemiconductor device of the present invention contains a silicone resin composition that has a high light transmittance and a high refractive index as a photosemiconductor element encapsulating material, thereby making it possible to extract light in the state of a high light emitting brightness even for a photosemiconductor device mounted with blue or white LED elements, so that the photosemiconductor device can be suitably used. Supposing that the brightness of the LED elements before encapsulation is 100%, the photosemiconductor device of the present invention has a light-extracting efficiency of preferably 150% or more, and more preferably from 160 to 180%, in a case where the photosemiconductor device contains a silicone resin composition of Embodiment 1; the photosemiconductor device has a light-extracting efficiency of preferably 170% or more, and more preferably from 170 to 190%, in a case where the photosemiconductor device contains a silicone resin composition of Embodiment 2; and the photosemiconductor device has a light-extracting efficiency of preferably 120% or more, and more preferably 140% or more, in a case where the photosemiconductor device contains a silicone resin composition of Embodiment 3.

EXAMPLES

The following examples further describe and demonstrate embodiments of the present invention. The examples are given solely for the purposes of illustration and are not to be construed as limitations of the present invention.
[Molecular Weight of Silicone Derivative]

The molecular weight of a silicone derivative is obtained by calculation based on polystyrenes in accordance with gel permeation chromatography (GPC).
[Alkoxy Group Content of Silicone Derivative]

The alkoxy group content of a silicone derivative is calculated from quantification in accordance with $^1$H-NMR using an internal standard substance and a weight loss in accordance with a differential thermogravimetric analysis.
[Refractive Indices of Silicone Derivative and Silicone Resin Composition]

A refractive index is measured with a prism coupler (SPA-4000, commercially available from Sairon Technology, Inc., Korea) at 25° C. and 633 nm.
[Average Particle Size of Fine Metal Oxide Particles]

The average particle size of the fine metal oxide particles as used herein means an average particle size of a primary particle, namely a volume-median particle size ($D_{50}$) measured in accordance with dynamic light scattering method with a particle dispersion of fine metal oxide particles.
[Content of Reactive Functional Group on Surface of Fine Metal Oxide Particles]

The content of a reactive functional group is calculated by adding ethyltrimethoxysilane as a surface treatment agent to a dispersion of fine metal oxide particles to react, allowing the fine particles to aggregate and precipitate by centrifugation or a pH fluctuation, collecting the fine particles by filtration, washing, drying, and obtaining a weight loss by a differential thermogravimetric analysis.
[Light Transmittance of Silicone Resin Composition]

The light transmittance at a wavelength of 400 nm is calculated by measuring a transmittance spectrum in the visible light region of from 400 to 800 nm with a spectrophotometer (U-4100, commercially available from Hitachi High-Technologies Corporation).

Example 1-1

In a container equipped with a stirrer, a reflux condenser, and a nitrogen inlet tube, an aqueous dispersion of zirconium oxide having an average particle size of 5 nm (trade name "NZD-3005," commercially available from Sumitomo Osaka Cement Co., Ltd., solid content: 40% by weight, containing a hydroxyl group as a reactive functional group, content of reactive functional group: 1.0% by weight or more) as fine metal oxide particles having a reactive functional group on the surface thereof (fine metal oxide particles A) was placed in an amount of 5.0 g (25 parts by weight, based on 100 parts by weight of the silicone derivative), and further 5.0 g of methanol and 5.0 g of 2-methoxyethanol were added thereto while stirring, and the temperature was raised to 60° C. Thereto was added dropwise a solution prepared by dissolving 8.0 g of a silicone derivative having an alkoxysilyl group at an end of a molecule [trade name "X-40-9225," commercially available from Shin-Etsu Chemical Co., Ltd., an alkoxysilane partially hydrolyzed condensate of the formulas (I) and (II), in which $R^3$ and $R^4$ of the formula (I) and $R^5$, $R^6$, and $R^7$ of the formula (II) are each a methyl group, molecular weight: from 2000 to 3000, methoxy content 24% by weight] in 8.0 g of 2-propanol (a resin solution of a silicone derivative) with a dropping funnel, and the components were reacted at 60° C. for 2 hours. Thereafter, the reaction mixture was cooled to room temperature, 25° C., the solvents were distilled off under a reduced pressure to concentrate the mixture, and 20 g of methanol was added to the concentrate while stirring to give a homogeneous solution. To the resulting solution, rutile type titanium oxide (trade name "TTO-51A," commercially available from ISHIHARA SANGYO KAISHA, LTD., average particle size: 20 to 30 nm, content of reactive functional group: less than 0.1% by weight) was added as fine metal oxide particles without a reactive functional group on the surface thereof (fine metal oxide particles B) in an amount of 1.0 g (12.5 parts by weight, based on 100 parts by weight of the silicone derivative), and the mixture was stirred with a beads-mill for 3 hours to disperse, to give a silicone resin composition. The resulting composition was applied to a PET substrate subjected to a removal treatment so as to form a film having a thickness of 50 μm, and heated at 100° C. for 1 hour, and then at 150° C. for 1 hour (the coating and heating step mentioned above may be also referred to as a film-forming step) to prepare a sheet-like formed article made of the composition. The resulting formed article had a transmittance at 400 nm of 91%, and a refractive index of 1.61.

Example 1-2

The same procedures as in Example 1-1 were carried out except that a liquid mixture prepared by dispersing 1.0 g of rutile type titanium oxide (trade name "V-3," commercially available from ISHIHARA SANGYO KAISHA, LTD., average particle size: 10 to 20 nm, content of reactive functional group: less than 0.1% by weight) as fine metal oxide particles without having a reactive functional group on the surface thereof (fine metal oxide particles B) and 8.0 g of the silicone derivative "X-40-9225" in 5.0 g of 2-propanol with a beads-mill, while stirring for 3 hours, i.e. a dispersion of the fine metal oxide particles B and the silicone derivative, was added to a dispersion of the fine metal oxide particles A, instead of dispersing the fine metal oxide particles B after adding the solution of a silicone derivative to a dispersion of the fine metal oxide particles A to react in Example 1-1, to give a silicone resin composition and a formed article made therefrom. The resulting formed article had a transmittance at 400 nm of 90%, and a refractive index of 1.61.

Example 1-3

The same procedures as in Example 1-1 were carried out except that a silicone derivative [trade name "KR500," commercially available from Shin-Etsu Chemical Co., Ltd., an alkoxysilane partially hydrolyzed condensate of the formulas (I) and (II), in which $R^3$ and $R^4$ of the formula (I) and $R^5$, $R^6$, and $R^7$ of the formula (II) are each a methyl group, molecular weight: from 1000 to 2000, methoxy content 28% by weight] was used in an amount of 8.0 g, in place of 8.0 g of the silicone derivative "X-40-9225" in Example 1-1, to give a silicone resin composition and a formed article made therefrom. The resulting formed article had a transmittance at 400 nm of 88%, and a refractive index of 1.63.

Example 1-4

The same procedures as in Example 1-1 were carried out except that a silicone derivative [trade name "KC89," commercially available from Shin-Etsu Chemical Co., Ltd., an alkoxysilane partially hydrolyzed condensate of the formulas (I) and (II), in which $R^3$ and $R^4$ of the formula (I) and $R^5$, $R^6$, and $R^7$ of the formula (II) are each a methyl group, molecular weight: from 300 to 500, methoxy content 45% by weight] was used in an amount of 8.0 g, in place of 8.0 g of the silicone derivative "X-40-9225" in Example 1-1, to give a silicone resin composition and a formed article made therefrom. The resulting formed article had a transmittance at 400 nm of 88%, and a refractive index of 1.65.

Example 1-5

The same procedures as in Example 1-1 were carried out except that a dispersion prepared below was used in place of 1.0 g of rutile type titanium oxide "TTO-51A" as fine metal oxide particles B, to give a silicone resin composition and a formed article made therefrom. A solution prepared by dissolving 5.0 g of methyltrimethoxysilane (trade name "KBM13," commercially available from Shin-Etsu Chemical Co., Ltd.) in 5.0 g of 2-propanol was added dropwise to a solution prepared by adding 5.0 g of methanol and 5.0 g of 2-methoxyethanol to 5.0 g of an aqueous dispersion of zirconium oxide "NZD-3005" at 60° C. while stirring, and thereafter the mixture was heated to 100° C., and the components were allowed to react for 1 hour. The low-boiling point solvents were distilled away from the resulting reaction mixture to adjust its solid content to 40% by weight, to give a dispersion of zirconium oxide of which amount of reactive functional groups on the surface thereof was reduced (content of reactive functional group: less than 0.1% by weight) (25 parts by weight, based on 100 parts by weight of the silicone derivative). The resulting formed article had a transmittance at 400 nm of 96%, and a refractive index of 1.60.

Comparative Example 1-1

The amount 1.0 g of the rutile type titanium oxide "TTO-51A" (12.5 parts by weight, based on 100 parts by weight of the silicone derivative) and 8.0 g of the silicone derivative "X-40-9225" were added to 20 g of 2-propanol, and the components were stirred with a beads-mill for 1 hour to disperse. Thereafter, an aluminum-based curing catalyst (trade name "CAT-AC," commercially available from Shin-Etsu Chemical Co., Ltd.) was added thereto while mixing so as to have a concentration of 1% by weight. Subsequently, the same procedures for a film-forming step as in Example 1-1 were carried out, to give a silicone resin composition and a formed article made therefrom. The resulting formed article had a transmittance at 400 nm of 78%, and a refractive index of 1.55, so that the transmittance and the refractive index were slightly lower than those of the compositions of Examples.

Comparative Example 1-2

The same procedures as in Example 1-1 were carried out except that 10.0 g of the aqueous dispersion of zirconium oxide "NZD-3005" was used (the amount accounting for 125 parts by weight, based on 100 parts by weight of the silicone derivative), in place of 5.0 g of the aqueous dispersion of zirconium oxide in Example 1-1, and further that 1.0 g of the rutile type titanium oxide "TTO-51A" of the fine metal oxide particles B used in Example 1-1 was not used, to prepare a solution of a resin composition. The resulting solution has a much higher viscosity, so that the solution was diluted with methanol to a solid content of 70% by weight. Subsequently, the same procedures for a film-forming step as in Example 1-1 were carried out, to give a silicone resin composition and a formed article made therefrom. The resulting formed article had a transmittance at 400 nm of 90%, and a refractive index of 1.49, so that the resulting composition in appearance was transparent, but when cooled to room temperature after curing, the resin was broken into pieces due to curing shrinkage.

Comparative Example 1-3

The same procedures as in Example 1-1 were carried out except that 8.0 g of methyltrimethoxysilane (trade name "KBM13," commercially available from Shin-Etsu Chemical Co., Ltd., molecular weight: 136.2, methoxy group content: 68% by weight) was used in place of 8.0 g of the silicone derivative having an alkoxysilyl group at an end of a molecule "X-40-9225" in Example 1-1, to give a silicone resin composition. A sheet-like formed article was produced in the same manner as in Example 1-1. However, having returning to room temperature after heating at 150° C. for 1 hour, the resulting sheet contained a large number of cracks, so that an evaluation thereon could not be made.

Test Example 1-1

Encapsulation of Photosemiconductor

Blue LEDs (trade name "C460 MB290," commercially available from CREE) were encapsulated with the silicone resin composition (refractive index: 1.61) of Example 1-1 in accordance with a conventional method. The brightness of the blue LEDs before and after the encapsulation was measured with Multi-Channel Photo-Detector System ("MCPD-3000," commercially available from Otsuka Electronics Co., Ltd.), and a light-extracting efficiency was obtained in accordance with the following formula. As a reference product, a commercially available silicone elastomer (trade name: "KE-1052," commercially available from Shin-Etsu Chemical Co., Ltd., refractive index: 1.40) was used.

Light-Extracting Efficiency (%)=(Brightness After Encapsulation/Brightness Before Encapsulation)×100

As a result, contrary to the reference product having a light-extracting efficiency of 160%, the silicone resin composition of the present invention (Example 1-1) had a light-extracting efficiency of 179%, so that it could be seen that the light-extracting efficiency was dramatically improved.

Examples 2-1 to 2-16 and Comparative Examples 2-1 and 2-2

In a container equipped with a stirrer, a reflux condenser, and a nitrogen inlet tube, an aqueous dispersion of zirconium oxide having an average particle size of 5 nm (trade name "NZD-3005," commercially available from Sumitomo Osaka Cement Co., Ltd., solid content: 40% by weight, containing a hydroxyl group as a reactive functional group, content of reactive functional group: 1.0% by weight or more) as fine metal oxide particles having a reactive functional group on the surface thereof was placed in an amount of 5.0 g (the amount used based on 100 parts by weight of the silicone derivative being 22 parts by weight in Examples 2-2 and 2-16, and 29 parts by weight in other examples), and further 5.0 g of methanol and 5.0 g of 2-methoxyethanol were added thereto, and the pH of the liquid mixture was adjusted to 2 to 3 with a concentrated hydrochloric acid, and the temperature was raised to 60° C. while stirring. Thereto, as a silicone derivative having a trifunctional alkoxysilyl group at an end of a molecule, a solution prepared by dissolving a silicone derivative for a first-stage reaction listed in Table 1 in an amount shown in Table 1 in 5.0 g of methanol was added dropwise with a dropping funnel over a period of 20 minutes, methanol was distilled off under a reduced pressure to concentrate the mixture, and the components were reacted at 100° C. for 30 minutes (a first-stage reaction). Subsequently, the reaction mixture was cooled to 60° C., and 5.0 g of 2-propanol was added while stirring to give a homogeneous solution. To the resulting solution, a solution prepared by dissolving a silicone derivative for a second-stage reaction listed in Table 1 in an amount shown in Table 1 in 3.0 g of tetrahydrofuran was added dropwise with a dropping funnel over a period of 20 minutes, and the components were reacted at 60° C. for 1 hour (a second-stage reaction). The reaction mixture was cooled to room temperature, 25° C., to give a silicone resin composition. The resulting composition was concentrated by distilling off the solvents and water under a reduced pressure, and thereafter, a ratio of reaction was obtained from a weight change when a part of the concentrate was taken and allowed to stand in a dryer at 150° C. for 3 hours. In addition, the composition was applied to a PET substrate subjected to a removal treatment so as to form a film having a thickness of 100 µm, and heated at 100° C. for 1 hour, and then at 150° C. for 1 hour, thereby producing a formed article (sheet) made of the composition. The ratio of reaction upon the termination of the polymerization reaction, and transmittance at 400 nm and refractive index of the formed article made of the resulting composition are shown in Table 1. Incidentally, as to the compositions of Comparative Examples 2-1 and 2-2, the polymerization reaction between the silicone derivative and the fine metal oxide derivative did not take place, and only the condensation reaction of the silicone derivatives progressed, so that excellent compositions could not be obtained.

Example 2-17

The same procedures as in Example 2-1 were carried out except that after the dropwise addition of a silicone derivative for a second-stage reaction in Example 2-1, the mixture was immediately cooled to room temperature, 25° C., without reacting the components, to give a silicone resin composition and a formed article. The amount of the fine metal oxide particles used was 29 parts by weight, based on 100 parts by weight of the silicone derivative.

Comparative Example 2-3

The same procedures as in Example 2-1 were carried out except that a solution prepared by adding 10.0 g of the silicone derivative "KBM103" to 10.0 g of 2-propanol while stirring was added dropwise to the aqueous dispersion of fine metal oxide particles, and the components were reacted only at 60° C., instead of the procedures in Example 2-1 that a solution prepared by adding 4.0 g of the silicone derivative "KBM13" to 5.0 g of methanol while stirring was added dropwise to the aqueous dispersion of fine metal oxide particles, that the components are reacted at 100° C., that thereto was added dropwise a solution prepared by adding 3.0 g of a silicone derivative "KBM13" in 3.0 g of 2-propanol while stirring, and that the components were reacted at 60° C., to give a silicone resin composition. The amount of the fine metal oxide particles used was 20 parts by weight, based on 100 parts by weight of the silicone derivative. However, the polymerization reaction between the silicone derivative and the fine metal oxide derivative did not take place, and only the condensation reaction of the silicone derivatives progressed, so that an excellent composition could not be obtained.

Comparative Example 2-4

The same procedures as in Example 2-1 were carried out except that a solution prepared by adding 4.0 g of the silicone derivative "KBM13" to 5.0 g of methanol while stirring was added dropwise to the aqueous dispersion of fine metal oxide particles without raising the mixture to a high temperature, and subsequently a solution prepared by adding 3.0 g of 2-propanol to 3.0 g of the silicone derivative "KBM13" was added dropwise to the aqueous dispersion of fine metal oxide particles, and the components were reacted together at 60° C., instead of the procedures in Example 2-1 that a solution prepared by adding 4.0 g of the silicone derivative "KBM13" to 5.0 g of methanol while stirring was added dropwise to the aqueous dispersion of fine metal oxide particles, that methanol was distilled away from the reaction mixture, that the components are reacted at 100° C., further that thereto was added dropwise a solution prepared by adding 3.0 g of a silicone derivative "KBM13" to 3.0 g of 2-propanol while stirring, and that the components were reacted at 60° C., to give a silicone resin composition. The amount of the fine metal oxide particles used was 29 parts by weight, based on 100 parts by weight of the silicone derivative. However, the polymerization reaction between the silicone derivative and the fine metal oxide derivative did not take place, and only the condensation reaction of the silicone derivatives progressed, so that an excellent composition could not be obtained.

Here, the silicone derivatives listed in Table 1 are as follow, each of which is commercially available from Shin-Etsu Chemical Co., Ltd.

[Trifunctional Alkoxysilane]

Methyltrimethoxysilane: trade name: "KBM13," molecular weight: 136.2, and refractive index: 1.369

Phenyltrimethoxysilane: trade name: "KBM103," molecular weight: 198.3, and refractive index: 1.473

Hexyltrimethoxysilane: trade name: "KBM3063," molecular weight: 206.4, and refractive index: 1.406

Vinyltrimethoxysilane: trade name: "KBM1003," molecular weight: 148.2, and refractive index: 1.397

2-(3,4-Epoxycyclohexyl)ethyltrimethoxysilane: trade name: "KBM303," molecular weight: 246.4, and refractive index: 1.448

3-Glycidoxypropyltrimethoxysilane: trade name: "KBM403," molecular weight: 236.3, and refractive index: 1.427 p-Styryltrimethoxysilane: trade name: "KBM1403," molecular weight: 224.3, and refractive index: 1.501

3-Methacryloxypropyltrimethoxysilane: trade name: "KBM503," molecular weight: 248.4, and refractive index: 1.429

3-Acryloxypropyltrimethoxysilane: trade name: "KBM5103," molecular weight: 234.4, and refractive index: 1.427

N-2-(Aminoethyl)-3-aminopropyltrimethoxysilane: trade name: "KBM603," molecular weight: 222.4, and refractive index: 1.445

3-Aminopropyltrimethoxysilane: trade name: "KBM903," molecular weight: 179.3, and refractive index: 1.422

N-Phenyl-3-aminopropyltrimethoxysilane: trade name: "KBM573," molecular weight: 255.4, and refractive index: 1.504

3-Mercaptopropyltrimethoxysilane: trade name: "KBM803," molecular weight: 196.4, and refractive index: 1.440

Decyltrimethoxysilane: trade name: "KBM3103C," molecular weight: 262.5, and refractive index: 1.421

Ethyltrimethoxysilane: trade name: "LS-890," molecular weight: 150.3, and refractive index: 1.384

[Bifunctional Alkoxysilane]

3-Methacryloxypropylmethyldimethoxysilane: trade name: "KBM502," molecular weight: 232.4, and refractive index: 1.433

Dimethyldimethoxysilane: trade name: "KBM22," molecular weight: 120.2, and refractive index: 1.371

TABLE 1

| | First-Stage Reaction | | | | Second-Stage Reaction |
|---|---|---|---|---|---|
| | Silicone Derivative | Molecular Weight | Refractive Index | Amount Used (g) | Silicone Derivative |
| Ex. 2-1 | Methyltrimethoxysilane | 136.2 | 1.369 | 4.0 | Phenyltrimethoxysilane |
| Ex. 2-2 | Methyltrimethoxysilane | 136.2 | 1.369 | 4.0 | Phenyltrimethoxysilane |
| Ex. 2-3 | Methyltrimethoxysilane | 136.2 | 1.369 | 4.0 | Hexyltrimethoxysilane |
| Ex. 2-4 | Methyltrimethoxysilane | 136.2 | 1.369 | 4.0 | Vinyltrimethoxysilane |
| Ex. 2-5 | Methyltrimethoxysilane | 136.2 | 1.369 | 4.0 | 2-(3,4-Epoxycyclohexyl)ethyltrimethoxysilane |
| Ex. 2-6 | Methyltrimethoxysilane | 136.2 | 1.369 | 4.0 | 3-Glycidoxypropyltrimethoxysilane |
| Ex. 2-7 | Methyltrimethoxysilane | 136.2 | 1.369 | 4.0 | p-Styryltrimethoxysilane |
| Ex. 2-8 | Methyltrimethoxysilane | 136.2 | 1.369 | 4.0 | 3-Methacryloxypropyltrimethoxysilane |
| Ex. 2-9 | Methyltrimethoxysilane | 136.2 | 1.369 | 4.0 | 3-Acryloxypropyltrimethoxysilane |
| Ex. 2-10 | Methyltrimethoxysilane | 136.2 | 1.369 | 4.0 | N-2-(Aminoethyl)-3-aminopropyltrimethoxysilane |
| Ex. 2-11 | Methyltrimethoxysilane | 136.2 | 1.369 | 4.0 | 3-Aminopropyltrimethoxysilane |
| Ex. 2-12 | Methyltrimethoxysilane | 136.2 | 1.369 | 4.0 | N-Phenyl-3-aminopropyltrimethoxysilane |
| Ex. 2-13 | Methyltrimethoxysilane | 136.2 | 1.369 | 4.0 | 3-Mercaptopropyltrimethoxysilane |
| Ex. 2-14 | Methyltrimethoxysilane | 136.2 | 1.369 | 4.0 | Decyltrimethoxysilane |
| Ex. 2-15 | Ethyltrimethoxysilane | 150.3 | 1.384 | 4.0 | Phenyltrimethoxysilane |
| Ex. 2-16 | Methyltrimethoxysilane | 136.2 | 1.369 | 6.0 | Phenyltrimethoxysilane |

TABLE 1-continued

| | | | | | |
|---|---|---|---|---|---|
| Ex. 2-17 | Methyltrimethoxysilane | 136.2 | 1.369 | 4.0 | Phenyltrimethoxysilane |
| Comp. Ex. 2-1 | Methyltrimethoxysilane | 136.2 | 1.369 | 4.0 | 3-Methacryloxypropylmethyldimethoxysilane |
| Comp. Ex. 2-2 | Methyltrimethoxysilane | 136.2 | 1.369 | 4.0 | Dimethyldimethoxysilane |
| Comp. Ex. 2-3 | — | — | — | — | Phenyltrimethoxysilane |
| Comp. Ex. 2-4 | — | — | — | — | Methyltrimethoxysilane Phenyltrimethoxysilane |

| | Second-Stage Reaction | | | Properties | |
|---|---|---|---|---|---|
| | Refractive Index | Amount Used (g) | Ratio of Reaction (%) | Transmittance (at 400 nm) (%) | Refractive Index |
| Ex. 2-1 | 1.473 | 3.0 | 56 | 96 | 1.61 |
| Ex. 2-2 | 1.473 | 5.0 | 59 | 93 | 1.57 |
| Ex. 2-3 | 1.406 | 3.0 | 46 | 98 | 1.52 |
| Ex. 2-4 | 1.397 | 3.0 | 61 | 96 | 1.51 |
| Ex. 2-5 | 1.448 | 3.0 | 50 | 96 | 1.54 |
| Ex. 2-6 | 1.437 | 3.0 | 51 | 95 | 1.55 |
| Ex. 2-7 | 1.501 | 3.0 | 46 | 95 | 1.58 |
| Ex. 2-8 | 1.429 | 3.0 | 42 | 95 | 1.52 |
| Ex. 2-9 | 1.427 | 3.0 | 44 | 95 | 1.52 |
| Ex. 2-10 | 1.445 | 3.0 | 66 | 91 | 1.50 |
| Ex. 2-11 | 1.422 | 3.0 | 62 | 90 | 1.51 |
| Ex. 2-12 | 1.504 | 3.0 | 61 | 91 | 1.53 |
| Ex. 2-13 | 1.440 | 3.0 | 57 | 95 | 1.55 |
| Ex. 2-14 | 1.421 | 3.0 | 53 | 87 | 1.47 |
| Ex. 2-15 | 1.473 | 3.0 | 57 | 94 | 1.58 |
| Ex. 2-16 | 1.473 | 3.0 | 52 | 91 | 1.56 |
| Ex. 2-17 | 1.473 | 3.0 | 29 | 91 | 1.60 |
| Comp. Ex. 2-1 | 1.433 | 3.0 | n. t. | n. t. | n. t. |
| Comp. Ex. 2-2 | 1.371 | 3.0 | n. t. | n. t | n. t. |
| Comp. Ex. 2-3 | 1.473 | 10.0 | n. t. | n. t. | n. t. |
| Comp. Ex. 2-4 | 1.369 1.473 | 4.0 3.0 | n. t. | n. t. | n. t. n. t. |

Note)
n. t.: not tested.

As a result, the compositions of Examples were excellent compositions, having high light transmittance and high refractive indices. On the other hand, the bifunctional alkoxysilanes themselves react with each other and form a highly hydrophobic silicone in the compositions of Comparative Examples 2-1 and 2-2; therefore, it is deduced that the composition did react with highly hydrophilic fine metal oxide particles, or had insufficient dispersion and formed aggregation and white turbid even when reacted. Also, since the compositions of Comparative Examples 2-3 and 2-4 had small solubility parameters and highly hydrophobic silicone derivatives were reacted in a single batch; therefore, it is deduced that the compositions did not react with fine metal oxide particles, or had insufficient dispersion and formed aggregation and white turbid even when reacted.

Test Example 2-1

Encapsulation of Photosemiconductor

Blue LEDs (trade name "C460MB290," commercially available from CREE) were encapsulated with the silicone resin composition (refractive index: 1.61) of Example 2-1 in accordance with a conventional method. The brightness of the blue LEDs before and after the encapsulation was measured with Multi-Channel Photo-Detector System ("MCPD-3000," commercially available from Otsuka Electronics Co., Ltd.), and a light-extracting efficiency was obtained in accordance with the following formula. As a reference product, a commercially available silicone elastomer (trade name: "KE-1052," commercially available from Shin-Etsu Chemical Co., Ltd., refractive index: 1.40) was used.

Light-Extracting Efficiency (%)=(Brightness After Encapsulation/Brightness Before Encapsulation)×100

As a result, while the light-extracting efficiency of the reference product is 160%, the light-extracting efficiency of the silicone resin composition (Example 2-2) of the present invention is 186%; therefore, it can be seen that the light-extracting efficiency in the present invention dramatically increases.

Example 3-1

In a container equipped with a stirrer, a reflux condenser, and a nitrogen inlet tube, an aqueous dispersion of zirconium oxide having an average particle size of 5 nm (trade name "NZD-3005," commercially available from Sumitomo Osaka Cement Co., Ltd., solid content: 40% by weight, containing a hydroxyl group as a reactive functional group, content of reactive functional group: 1.0% by weight or more) as fine metal oxide particles having a reactive functional group on the surface thereof was placed in an amount of 5.0 g (25 parts by weight, based on 100 parts by weight of the silicone derivative), and further 5.0 g of methanol and 5.0 g of 2-methoxyethanol were added thereto while stirring, and the temperature was raised to 60° C. Thereto was added dropwise a solution prepared by dissolving 8.0 g of a silicone derivative having an alkoxysilyl group containing an aromatic group at an end of a molecule [trade name "KR213," commercially available from Shin-Etsu Chemical Co., Ltd., an alkoxysilane partially hydrolyzed condensate of the formulas (IV) and (V), in which $R^{10}$, $R^{11}$, and $R^{12}$ of the formula (IV) and $R^{13}$, $R^{14}$, and $R^{15}$ of the formula (V) are each a methyl group, $R^9$ of the formula (IV) and $X^3$ of the formula (V) are each a phenyl group, molecular weight: from 200 to 600, methoxy content: 20% by weight] in 8.0 g of 2-propanol with a dropping funnel, the components were reacted at 60° C. for 2 hours, and the reaction mixture was then cooled to room temperature, 25° C., to give a silicone resin composition. The resulting composition was concentrated by distilling off the solvents under a reduced pressure, and 1 g of methanol was added while stirring to give a homogeneous solution. The resulting composition was applied to a PET substrate subjected to a removal treatment so as to form a film having a thickness of 100 μm, and heated at 100° C. for 1 hour, and then at 150° C. for 1 hour, thereby producing a formed article (sheet) made of the composition. The resulting formed article had a transmittance at 400 nm of 91%, and a refractive index of 1.58.

Example 3-2

The same procedures as in Example 3-1 were carried out except that 11.0 g of the silicone derivative "KR213" was used instead of 8.0 g of that in Example 3-1, to give a silicone resin composition and a formed article made therefrom. The resulting formed article had a transmittance at 400 nm of 90%, and a refractive index of 1.61. The amount of the fine metal oxide particles used was 18 parts by weight, based on 100 parts by weight of the silicone derivative.

Example 3-3

The same procedures as in Example 3-1 were carried out except that 8.0 g of a silicone derivative [trade name "KR9218," commercially available from Shin-Etsu Chemical Co., Ltd., an alkoxysilane partially hydrolyzed condensate of the formulas (IV) and (V), in which $R^{12}$ of the formula (IV) and $R^{13}$, $R^{14}$, and $R^{15}$ of the formula (V) are each a methyl group, and $R^9$, $R^{10}$, and $R^{11}$ of the formula (IV) and $X^3$ of the formula (V) are each a phenyl group, molecular weight: from 500 to 1000, methoxy content: 15% by weight] was used instead of 8.0 g of the silicone derivative "KR213" in Example 3-1, to give a silicone resin composition and a formed article made therefrom. The resulting formed article had a transmittance at 400 nm of 90%, and a refractive index of 1.58.

Example 3-4

The same procedures as in Example 3-1 were carried out except that 8.0 g of a silicone derivative [trade name "KR510," commercially available from Shin-Etsu Chemical Co., Ltd., an alkoxysilane partially hydrolyzed condensate of the formulas (IV) and (V), in which $R^{11}$ and $R^{12}$ of the formula (IV) and $R^{13}$, $R^{14}$, and $R^{15}$ of the formula (V) are each a methyl group, and $R^9$ and $R^{10}$ of the formula (IV) and $X^3$ of the formula (V) are each a phenyl group, molecular weight: from 400 to 1000, methoxy content: 17% by weight] was used instead of 8.0 g of the silicone derivative "KR213" in Example 3-1, to give a silicone resin composition and a formed article made therefrom. The resulting formed article had a transmittance at 400 nm of 86%, and a refractive index of 1.57.

Example 3-5

The same procedures as in Example 3-1 were carried out except that 5.0 g of the silicone derivative "KR213" and 3.0 g of a silicone resin containing an alkoxysilyl group at an end of a molecule [trade name "X-40-9225," commercially available from Shin-Etsu Chemical Co., Ltd., an alkoxysilane partially hydrolyzed condensate of the formulas (IV) and (V), in which $R^{11}$ and $R^{12}$ of the formula (IV) and $R^{13}$, $R^{14}$, and $R^{15}$ of the formula (V) are each a methyl group, molecular weight: from 2000 to 3000, methoxy content: 24% by weight, and aromatic group content: 0% by weight] was used instead of 8.0 g of the silicone derivative "KR213" in Example 3-1, to give a silicone resin composition and a formed article made therefrom. The resulting formed article had a transmittance at 400 nm of 92%, and a refractive index of 1.56.

Example 3-6

The same procedures as in Example 3-1 were carried out except that 8.0 g of a silicone derivative [trade name "KR217," commercially available from Shin-Etsu Chemical Co., Ltd., an alkoxysilane partially hydrolyzed condensate of the formulas (IV) and (V), in which $R^{11}$ and $R^{12}$ of the formula (IV) and $R^{13}$, $R^{14}$, and $R^{15}$ of the formula (V) are each a methyl group, and $R^9$ and $R^{10}$ of the formula (IV) and $X^3$ of the formula (V) are each a phenyl group, molecular weight: from 200 to 1000, methoxy content: 25% by weight] was used instead of 8.0 g of the silicone derivative "KR213" in Example 3-1, to give a silicone resin composition and a formed article made therefrom. The resulting formed article had a transmittance at 400 nm of 85%, and a refractive index of 1.61.

Example 3-7

The same procedures as in Example 3-1 were carried out except that 8.0 g of a silicone derivative [trade name "KBM202SS," commercially available from Shin-Etsu Chemical Co., Ltd., diphenyldimethoxysilane, where $R^{11}$ and $R^{12}$ are each a methyl group, and $R^9$ and $R^{10}$ are each a phenyl group in the formula (IV), molecular weight: 244, methoxy content: 25% by weight] was used instead of 8.0 g of the silicone derivative "KR213" in Example 3-1, to give a silicone resin composition and a formed article made therefrom. The resulting formed article had a transmittance at 400 nm of 89%, and a refractive index of 1.58.

Example 3-8

The same procedures as in Example 3-1 were carried out except that 8.0 g of the aqueous dispersion of titanium oxide having an average particle size of 15 nm (trade name: "TTIE," commercially available from Center for Nano Materials and Technology, JAIST, solid content: 25% by weight, containing a hydroxyl group as a reactive functional group) (25 parts by weight based on 100 parts by weight of the silicone derivative) was used instead of 5.0 g of the aqueous dispersion of zirconium oxide "NZD-3005" in Example 3-1, to give a silicone resin composition and a formed article made therefrom. The resulting formed article had a transmittance at 400 nm of 90%, and a refractive index of 1.61.

Comparative Example 3-1

The same procedures as in Example 3-1 were carried out except that 8.0 g of a silicone derivative [trade name "KBM500," commercially available from Shin-Etsu Chemical Co., Ltd., molecular weight: from 1000 to 2000, methoxy content: 28% by weight, aromatic group content: 0% by weight] was used instead of 8.0 g of the silicone derivative "KR213" in Example 3-1, to give a silicone resin composition and a formed article made therefrom. While the resulting formed article had a transmittance at 400 nm of 92%, showing transparency, the formed article had a refractive index of as low as 1.45.

Test Example 3-1

Encapsulation of Photosemiconductor

Blue LEDs (trade name "C460MB290," commercially available from CREE) were encapsulated with the silicone resin composition (refractive index: 1.61) of Example 3-1 in accordance with a conventional method. The brightness of the blue LEDs before and after the encapsulation was measured with Multi-Channel Photo-Detector System ("MCPD-3000," commercially available from Otsuka Electronics Co., Ltd.), and a light-extracting efficiency was obtained in accordance with the following formula. As a reference product, a commercially available silicone elastomer (trade name: "KE-1052," commercially available from Shin-Etsu Chemical Co., Ltd., refractive index: 1.40) was used.

Light-Extracting Efficiency (%)=(Brightness After Encapsulation/Brightness Before Encapsulation)×100

As a result, while the light-extracting efficiency of the reference product is 160%, the light-extracting efficiency of the silicone resin composition (Example 3-1) of the present invention is 186%; therefore, it can be seen that the light-extracting efficiency in the present invention dramatically increases.

The silicone resin composition of the present invention can be suitably used as, for example, materials for encapsulating photosemiconductor elements for use in backlights for liquid crystal displays, traffic lights, outdoor big displays, advertisement sign boards, and the like.

The present invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A silicone resin composition comprising:
a silicone resin; and
first fine metal oxide particles without having a reactive functional group or with a protected reactive functional group on a surface thereof,
wherein said silicone resin is obtained by a process comprising carrying out a polymerization reaction between a silicone derivative and second fine metal oxide particles, the silicone derivative has an alkoxysilyl group at an end of a molecule and a molecular weight of from 200 to 3000, the second fine metal oxide particles have a reactive functional group on a surface thereof, and said first fine metal oxide particles are dispersed in the silicone resin and included in an amount of from 1 to 70 parts by weight of the silicone derivative.

2. The silicone resin composition according to claim 1, wherein the second fine metal oxide particles have an average particle size of from 1 to 100 nm.

3. The silicone resin composition according to claim 1, wherein the first fine metal oxide particles have an average particle size of from 1 to 100 nm.

4. The silicone resin composition according to claim 1, wherein the first fine metal oxide particles comprise at least one member selected from the group consisting of titanium oxide, zinc oxide, zirconium oxide, barium titanate, and silicon dioxide.

5. The silicone resin composition according to claim 1, wherein the silicone derivative comprises an alkoxy group in an amount of from 11 to 50% by weight per one molecule of the silicone derivative.

6. A silicone resin composition obtained by a process comprising carrying out a polymerization reaction between a silicone derivative and fine metal oxide particles,
wherein the silicone derivative has a trifunctional alkoxysilyl group at an end of a molecule, the fine metal oxide particles have a reactive functional group on a surface thereof, said silicone derivative comprises two or more kinds of silicone derivatives each having a trifunctional alkoxysilyl group at an end of a molecule, and said silicone derivative is added in two or more divided stages in a presence of the fine metal oxide particles in the polymerization reaction, the silicone derivative added in a first stage is a trifunctional alkoxysilane having a molecular weight of 160 or less, and a second stage of the polymerization reaction is performed until a ratio of reaction reaches 20 to 70%.

7. The silicone resin composition according to claim 6, wherein the silicone derivative comprises a compound represented by formula (III):

wherein $OR^8$ is an alkoxy group, wherein $R^8$ is a linear or branched alkyl group having 1 to 4 carbon atoms; and $X^2$ is a linear or branched alkyl group having 1 to 12 carbon atoms, which may comprise a heteroatom at an end, or may comprise an epoxy group, a primary, secondary, or tertiary amino group, a (meth)acryloyl group, a cyclohexylepoxy group, or an aromatic group at an end.

8. The silicone resin composition according to claim 6, wherein the fine metal oxide particles have an average particle size of from 1 to 100 nm.

9. The silicone resin composition according to claim 6, wherein the fine metal oxide particles comprise at least one member selected from the group consisting of titanium oxide, zirconium oxide, barium titanate, silica, alumina, and hafnium oxide.

10. The silicone resin composition according to claim 6, wherein an overall ratio of reaction at termination of the polymerization reaction is from 20 to 70%.

11. The silicone resin composition according to claim 6, wherein the fine metal oxide particles having a reactive functional group on a surface thereof and the silicone derivative having a trifunctional alkoxysilyl group at an end of a molecule are subjected to a polymerization reaction, in a dispersion of the fine metal oxide particles.

12. A silicone resin composition obtained by a process comprising carrying out a polymerization reaction between a silicone derivative and fine metal oxide particles, wherein the silicone derivative has an alkoxysilyl group at an end of a molecule or in a side chain thereof, the fine metal oxide particles have a reactive functional group on a surface thereof, the alkoxysilyl group comprises a silyl group having a silicon atom to which an alkoxy group and an aromatic group are directly bonded as functional groups, and an amount of the fine metal oxide particles in the polymerization reaction is from 1 to 70 parts by weight based on 100 parts by weight of the silicone derivative.

13. The silicone resin composition according to claim 12, wherein an alkoxy group is contained in an amount of from 10 to 40% by weight per one molecule of the silicone derivative.

14. The silicone resin composition according to claim 12, wherein the fine metal oxide particles have an average particle size of from 1 to 100 nm.

15. The silicone resin composition according to claim 12, wherein the fine metal oxide particles comprise at least one member selected from the group consisting of titanium oxide, zirconium oxide, barium titanate, silica, alumina, and hafnium oxide.

16. The silicone resin composition according to claim 12, wherein the fine metal oxide particles and the silicone derivative are subjected to the polymerization reaction in a dispersion of the fine metal oxide particles.

17. A silicone resin sheet formed by a process comprising applying a coating comprising the silicone resin composition as defined in claim 1 on a substrate, and drying the coating.

18. A silicone resin sheet formed by process comprising applying a coating comprising the silicone resin composition as defined in claim 6 on a substrate, and drying the coating.

19. A silicone resin sheet formed by a process comprising applying a coating comprising the silicone resin composition as defined in claim 12 on a substrate, and drying the coating.

20. A photosemiconductor device comprising:
a photosemiconductor element encapsulated with the silicone resin composition as defined in claim 1.

21. A photosemiconductor device comprising:
a photosemiconductor element encapsulated with the silicone resin composition as defined in claim 6.

22. A photosemiconductor device comprising:
a photosemiconductor element encapsulated with the silicone resin composition as defined in claim 12.

* * * * *